(12) United States Patent
Gieras et al.

(10) Patent No.: US 11,050,322 B2
(45) Date of Patent: Jun. 29, 2021

(54) FLYWHEEL ENERGY STORAGE WITH PM, INDUCTION, OR VARIABLE RELUCTANCE MACHINE

(71) Applicant: Hamilton Sundstrand Corporation, Charlotte, NC (US)

(72) Inventors: Jacek F. Gieras, Glastonbury, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 236 days.

(21) Appl. No.: 15/854,305

(22) Filed: Dec. 26, 2017

(65) Prior Publication Data

US 2019/0199164 A1    Jun. 27, 2019

(51) Int. Cl.
*H02K 7/02*    (2006.01)
*H02K 5/02*    (2006.01)
(Continued)

(52) U.S. Cl.
CPC .............. *H02K 7/025* (2013.01); *H02K 1/12* (2013.01); *H02K 1/27* (2013.01); *H02K 5/02* (2013.01);
(Continued)

(58) Field of Classification Search
CPC ...... H02K 1/27; H02K 1/2786; H02K 1/2793; H02K 5/02; H02K 5/26; H02K 7/02;
(Continued)

(56) References Cited

U.S. PATENT DOCUMENTS

| 2,792,505 | A | * | 5/1957 | Baudry | ................... | F03B 11/00 |
| | | | | | | 290/52 |
| 3,027,471 | A | * | 3/1962 | Burgwin | ................ | G01C 19/08 |
| | | | | | | 310/74 |

(Continued)

FOREIGN PATENT DOCUMENTS

| CN | 2452204 Y | 10/2001 |
| EP | 2728716 A2 | 7/2014 |

(Continued)

OTHER PUBLICATIONS

Huynh, Co, "Flywheel Energy Storage System for Naval Applications", ASME Turbo Expo 2006, dated May 8, 2006, 9 pages.

(Continued)

*Primary Examiner* — Ahmed Elnakib
(74) *Attorney, Agent, or Firm* — Kinney & Lange, P.A.

(57) ABSTRACT

An integrated flywheel energy storage device includes an inner stator having an interior support component and multiple stator cores connected to the interior support component, each with an associated stator coil arranged in multiple electrical phases. An outer rotor housing supports multiple active rotor poles which each face inward toward the stator cores, the active rotor poles being permanent magnets, copper relining, an induction squirrel cage, or variable reluctance poles. A vacuum containment housing surrounds the outer rotor housing. The outer rotor housing has a rotational moment of inertia that stores kinetic energy as a kinetic battery, allowing the device to deliver multi-phase electrical power when required. High power density is achieved by integrating the flywheel into the outer rotor housing. The device additionally functions as a gyroscope for stabilizing an exterior structure, or as a gyroscopic reference for navigational purposes when supported on a gimballed platform.

9 Claims, 7 Drawing Sheets

(51) Int. Cl.
*H02K 5/26* (2006.01)
*H02K 1/27* (2006.01)
*H02K 1/12* (2006.01)

(52) U.S. Cl.
CPC .............. *H02K 5/26* (2013.01); *H02K 1/2786* (2013.01); *H02K 1/2793* (2013.01)

(58) Field of Classification Search
CPC ...... H02K 7/025; H02K 21/22; H02K 21/222; H02K 21/225; H02K 21/227
USPC .......................................................... 310/74
See application file for complete search history.

(56) References Cited

U.S. PATENT DOCUMENTS

| | | | | |
|---|---|---|---|---|
| 4,182,967 A | * | 1/1980 | Jordan | H02K 7/025 |
| | | | | 310/74 |
| 4,668,885 A | | 5/1987 | Scheller | |
| 5,614,777 A | | 3/1997 | Bitterly et al. | |
| 5,862,686 A | | 1/1999 | Skrippek | |
| 5,931,249 A | | 8/1999 | Ellis et al. | |
| 6,727,616 B1 | | 4/2004 | Gabrys et al. | |
| 6,768,237 B1 | | 7/2004 | Schroedl | |
| 6,798,092 B1 | * | 9/2004 | Gabrys | H02K 7/025 |
| | | | | 310/43 |
| 8,698,365 B2 | | 4/2014 | Hull et al. | |
| 2002/0003381 A1 | * | 1/2002 | Nelson | F04D 25/0646 |
| | | | | 310/67 R |
| 2003/0094873 A1 | * | 5/2003 | Kim | H02K 1/278 |
| | | | | 310/156.43 |
| 2004/0160141 A1 | | 8/2004 | Dube | |
| 2004/0251753 A1 | * | 12/2004 | Wingett | F16F 15/315 |
| | | | | 310/74 |
| 2007/0228860 A1 | * | 10/2007 | Rao | H02K 1/12 |
| | | | | 310/156.37 |
| 2011/0114406 A1 | | 5/2011 | Gibson et al. | |
| 2013/0261001 A1 | * | 10/2013 | Hull | H02K 7/025 |
| | | | | 505/166 |
| 2014/0333167 A1 | * | 11/2014 | Akamatsu | H02K 21/222 |
| | | | | 310/153 |
| 2015/0130307 A1 | | 5/2015 | Sherman et al. | |
| 2015/0143932 A1 | * | 5/2015 | Igarashi | B62D 37/06 |
| | | | | 74/5.4 |
| 2016/0365814 A1 | * | 12/2016 | Gieras | H02K 19/38 |
| 2017/0012489 A1 | * | 1/2017 | Townend | H02K 7/025 |
| 2017/0257008 A1 | | 9/2017 | Doerksen et al. | |
| 2017/0279335 A1 | | 9/2017 | Bender et al. | |

FOREIGN PATENT DOCUMENTS

| | | | |
|---|---|---|---|
| JP | 6194532 A | | 5/1986 |
| JP | 2010220427 A | | 9/2010 |
| JP | 2017204959 A | | 11/2017 |
| WO | WO 2015110816 | * | 7/2015 |

OTHER PUBLICATIONS

Gieras, Jacek F., "Permanent Magnet Motor Technology: Design and Applications, Third Edition", CRC Press, Aug. 26, 2009, 48 pages.
Richards, Frances, "Machine Design", Penton Media, Inc., http://www.machinedesign.com/motorsdrives/motors-efficiency-permanent-magnet-reluctance-andinduction-motors-compared, 2013, 7 pages.
Wheeler, Pat, "The More Electric Aircraft: Why Aerospace Needs Power Electronics", the University of Nottingham, Feb. 25, 2014, 24 pages.
"Halbach array", Wikipedia.org, https://en.wikipedia.org/wiki/Halbach_array, Oct. 28, 2017, 7 pages.
"Reluctance motor", Wikipedia.org, https://en.wikipedia.org/wiki/Reluctance_motor, Sep. 19, 2017, 3 pages.
Extended European Search Report dated Mar. 11, 2019, received for corresponding European Application No. 18215585.3.
European Office Action dated Jan. 23, 2020, received for corresponding European Application No. 18215585.3, 12 pages.
European Office Action dated Jul. 16, 2020, received for corresponding European Application No. 18215585.3, 11 pages.

* cited by examiner

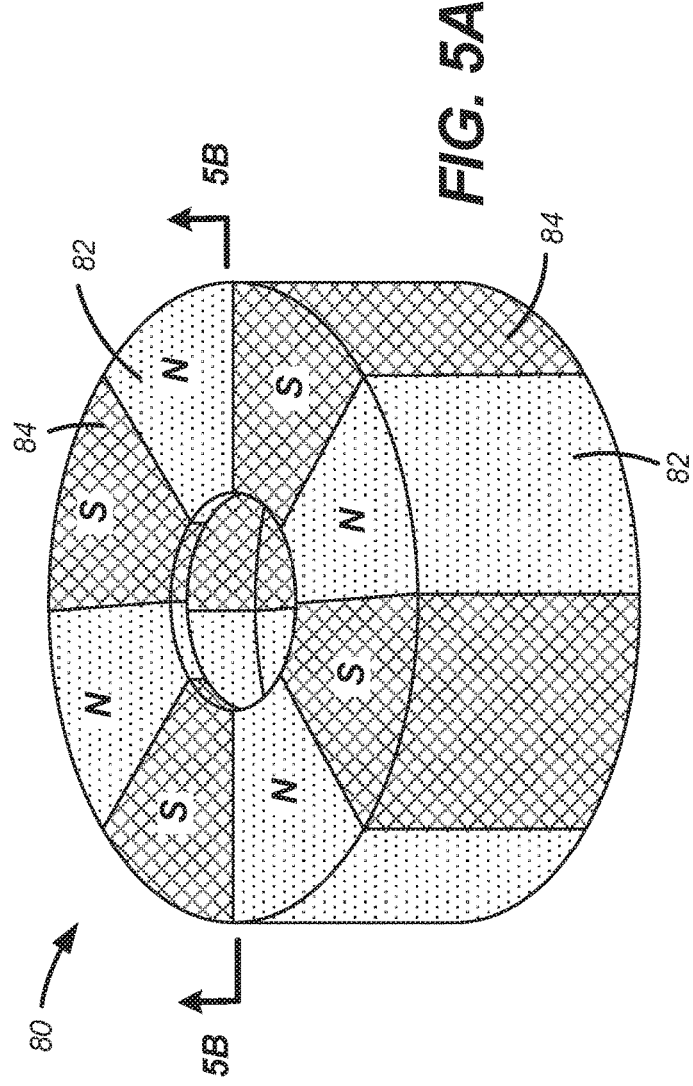
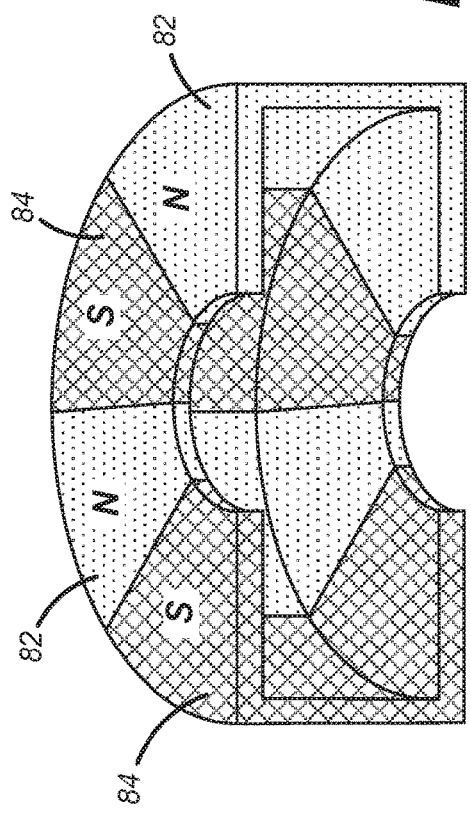

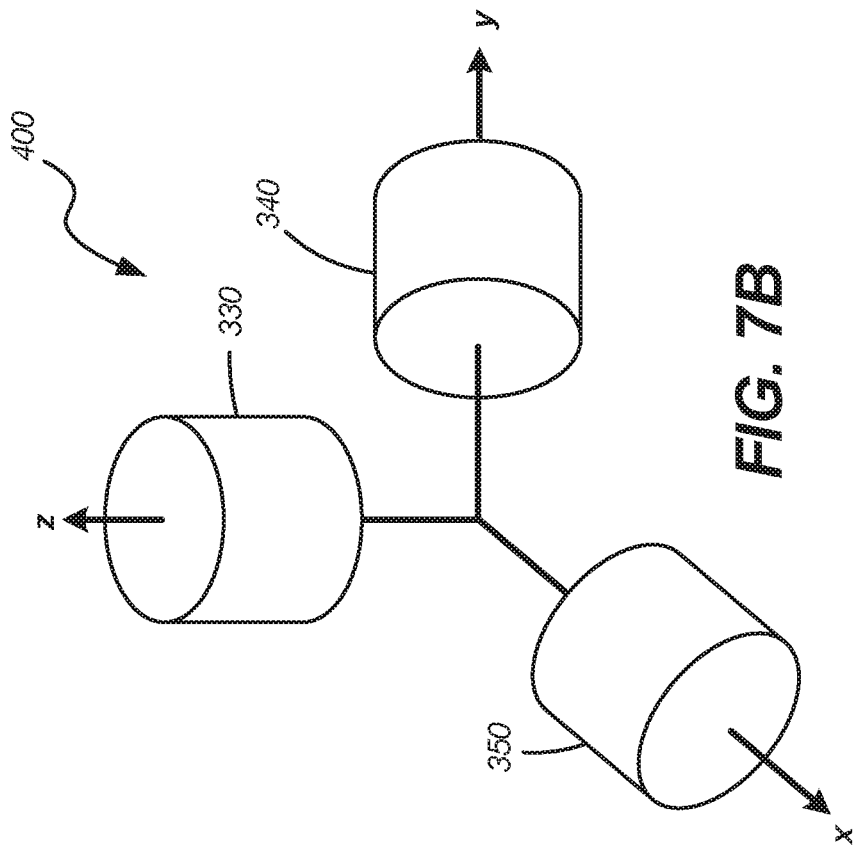
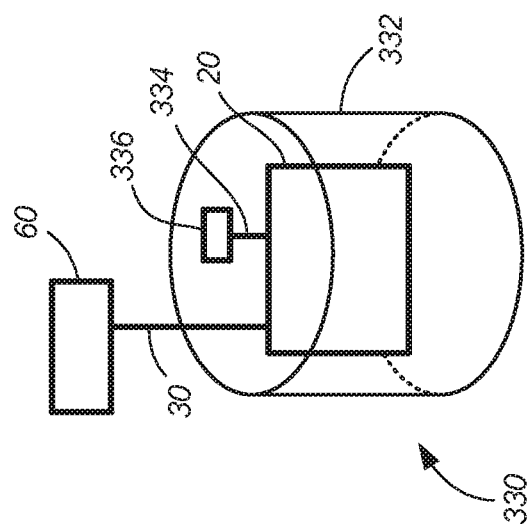

FLYWHEEL ENERGY STORAGE WITH PM, INDUCTION, OR VARIABLE RELUCTANCE MACHINE

BACKGROUND

A flywheel energy storage (FES) system draws electrical energy from a primary source, such as the utility grid or vehicle-mounted generator, and stores it as kinetic energy in a high mass-density rotating flywheel spinning at very high speeds. Upon loss of electrical power the motor driving the flywheel acts as a generator, converting stored kinetic energy into electrical energy to supply electrical power as needed. An FES system, used as a kinetic battery, may have advantages over chemical battery storage systems including a longer service lifetime and greater operating temperature range.

FIG. 1 is a cross-sectional side view of flywheel energy storage (FES) system 10 of the prior art. Shown in FIG. 1 are FES system 10, flywheel 11, rotor 12, stator 13, radial magnetic bearings 14, radial rolling bearings 15, thrust magnetic bearing 16, burst shield 17, vacuum containment case 18, and void 19. FES system 10 functions as a kinetic battery, storing rotational kinetic energy within flywheel 11, which can be rotating at a speed greater than 20,000 rpm. The stored rotational kinetic energy of flywheel 11 can be calculated by the following equation:

$$KE_{Rotational} = \frac{1}{2} I \omega^2 \quad \text{Equation 1:}$$

where I is the rotational moment of inertia and ω is the angular velocity.

Rotor 12 and stator 13 comprise the electromechanical motor/generator of FES system 10, with stator 13 surrounding rotor 12, as is common with electrical motors and generators of the prior art. Rotor 12 generally contains permanent magnets to provide brushless motor/generator operation. Radial magnetic bearings 14 provide radial support for the common axel of flywheel 11 and rotor 12 when FES system 10 is operating, while minimizing frictional losses. Radial roller bearings 15 provide radial support for the common axle of flywheel 11 and rotor 12 when FES system is stationary or operating at low speed. Thrust magnetic bearing 16 supports the weight of flywheel 11 and rotor 12 when FES system 10 is operating, while minimizing frictional losses. A mechanical thrust bearing (not shown) supports the weight of flywheel 11 and rotor 12 when FES system 10 is stationary or operating at low speed. Burst shield 17 is installed in case of the catastrophic failure of flywheel 11 at operational speed, thereby preventing or minimizing damage to surrounding components, systems, or personnel. Vacuum containment case 18 provides an airtight enclosure around the interior rotating components of FES system 10, thereby enabling a vacuum to be created within void 19 by evacuating the air from FES system 10. Operating FES system 10 in a vacuum reduces or eliminates windage losses which may be significant at very high operational speeds. The components that are used for creating and maintaining a vacuum within FES system 10 are not shown. Electrical connections and the individual components that comprise various magnetic bearings are not shown, because they are well-known in the arts.

FES system 10 as depicted in FIG. 1 is widely used as a kinetic battery, offering several advantages over a chemical battery, particularly where the overall mass and physical volume of FES system 10 is not of great concern. Rotor 12 and stator 13 are typical configurations of electrical rotating machines found in the prior art, wherein stator 13, being stationary, surrounds rotor 12, being the rotational component of an electrical machine. The size and mass of stator 13 primarily contributes to the overall mass and physical volume of FES system 10. Rotor 12, being of fairly small radius, has a relatively small rotational moment of inertia (I). In many applications where an electrical rotating machine is used, a relatively small rotational moment of inertia (I) can be desirable to allow for more rapid acceleration and deceleration of rotor 12 during operation. However, for FES system 10 to be useful, flywheel 11, having a relatively large rotational moment of inertia (I), is mechanically connected to rotor 12. Accordingly, the height of FES system 10 is in part dictated by the combined heights of flywheel 11 and rotor 12.

SUMMARY

According to one embodiment of the present disclosure, an integrated flywheel energy storage device includes a an inner stator defining a centerline, an interior support component aligned with the centerline, multiple stator cores connected to the support structure, and multiple stator coils, each situated on a stator core. An outer rotor has a rotor housing that supports multiple active rotor poles arranged on the interior of the rotor housing, arranged in the vicinity of the stator cores.

According to another embodiment of the present disclosure, an electrical energy storage system includes the aforedescribed integrated flywheel energy storage device along with a power control circuit that is electrically connected to the stator coils. The outer rotor housing produces rotational torque when electrical power is supplied to the stator coils, converting electrical energy into rotational kinetic energy. The stator coils produce electrical power when rotational kinetic energy is supplied by the outer rotor housing, thereby converting rotational kinetic energy into electrical energy. The power control circuit produces a multi-phase variable frequency waveform from an electrical power input and energizes the stator coils with the multi-phase variable frequency waveform when operating in an energy storage mode. The power control circuit receives the multi-phase variable frequency waveform from the stator coils and produces electrical power output, thereby producing electrical power when operating in an energy usage mode.

BRIEF DESCRIPTION OF THE DRAWINGS

FIG. 5A is a perspective view of the rotor permanent magnet array of the IFES system shown in FIG. 2.

FIG. 5B is a perspective cross-sectional view of the rotor permanent magnet array shown in FIG. 5A.

FIG. 7A is a schematic view of the IFES system as a gyroscopic reference.

FIG. 7B is a schematic view showing a configuration of three IFES system gyroscopic references.

DETAILED DESCRIPTION

Figure 2:
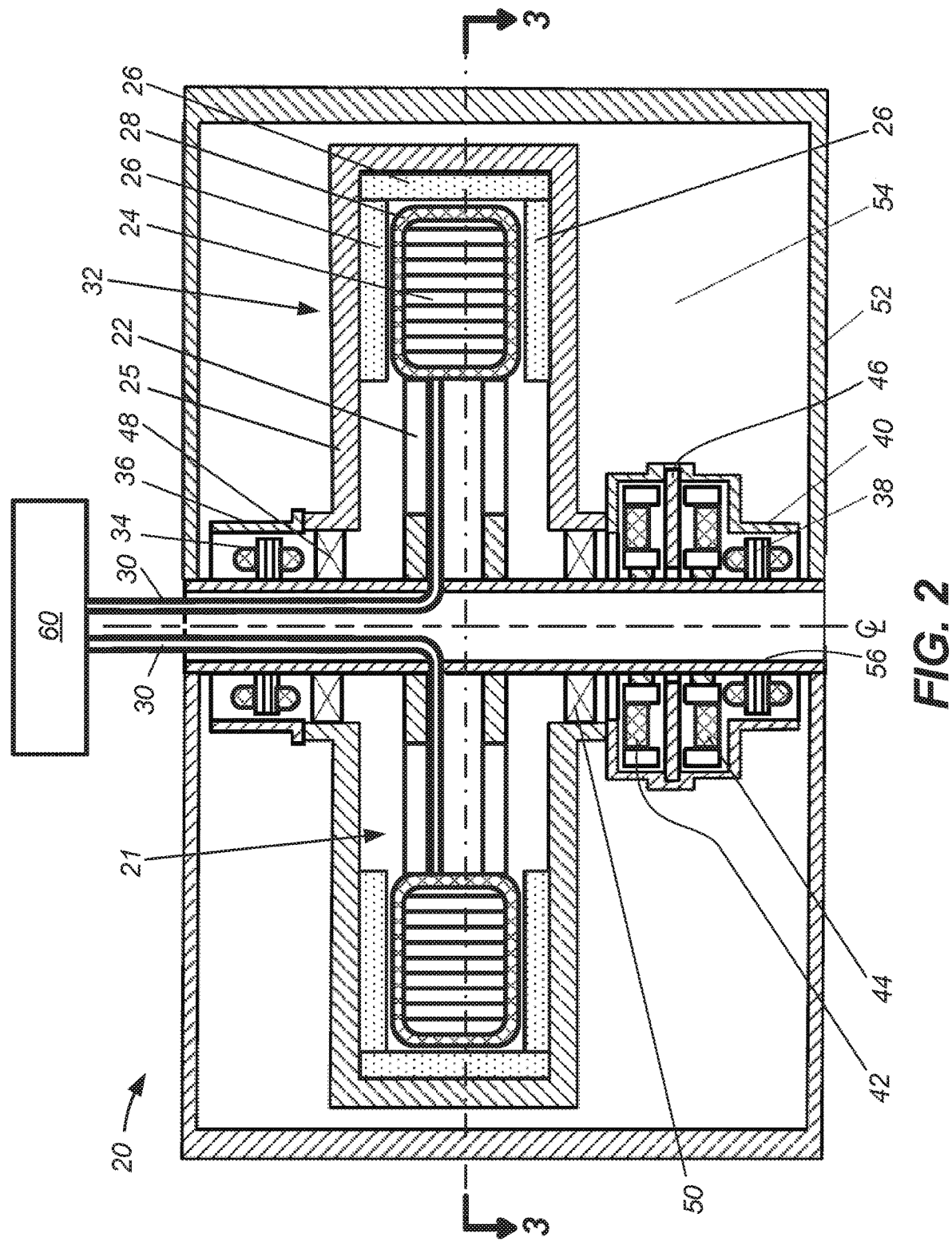
FIG. 2 is a cross-sectional side view of the integrated flywheel energy storage (IFES) system.

FIG. 2 is a cross-sectional side view of Integrated Flywheel Energy Storage (IFES) system 20 of the present disclosure. FIG. 2 is taken at line 2-2 in FIG. 3. Shown in FIG. 2 are IFES system 20, inner stator 21, stator support 22, stator core 24, rotor housing 25, rotor active surfaces 26, stator coil 28, electrical leads 30, rotor 32, upper radial magnetic bearing stator 34, upper radial magnetic bearing rotor 36, lower radial magnetic bearing stator 38, lower radial magnetic bearing rotor 40, upper axial magnetic bearing stator 42, lower axial magnetic bearing stator 44, axial magnetic bearing rotor 46, upper rolling bearing 48, lower rolling bearing 50, vacuum containment case 52, void 54, stationary bushing 56, centerline $C_L$, and power control circuit 60. Stator 21 is comprised of stator support 22, stator cores 24, and stator coils 28. Stator support 22 holds stator cores 24 in position from stationary bushing 56 in the center of IFES system 20, as depicted by centerline $C_L$. Stator support 22 thereby holds outward-facing stator cores 24 within the interior of rotor 32 in IFES system 20. Stator support 22 is constructed of a non-ferromagnetic material such as aluminum or brass. Stator support 22 can also be constructed of fiberglass or a lightweight composite material to minimize the overall weight of IFES system 20. Stator support 22 can also be referred to as an interior stator support component, to differentiate it from electrical machine stators of the prior art.

Stator coil 28 surrounds stator core 24, with one stator coil 28 surrounding each stator core 24. Stator coil 28 is made using an insulated electrical conductor for the winding. In an embodiment, stator coil 28 is made using epoxy-coated copper wire. In other embodiments, other insulated conductors can be used for stator coil 28. A plurality of stator cores 24 and stator coils 28 comprise stator 21, with one stator coil 28 being disposed on each stator core 24. Generally, the number of stator coils 28 is dictated at least in part by the number of electrical phases being used in IFES system 20 (this will be illustrated in greater detail in FIG. 3). The overall physical size of IFES system 20 may also affect the number of stator cores 24 that may be used, with a greater number of stator coils 28 generally being available on a larger IFES system 20. Electrical leads 30 provide the electrical connection from stator coils 28 to power control circuit 60.

In IFES system 20 depicted in FIG. 2, stator core 24 is a tape-wound core design, which is constructed by winding a thin ribbon, or tape, of a soft ferromagnetic material repeatedly around an inner core. A soft ferromagnetic material has a high magnetic permeability and a small magnetic coercivity, and is therefore used to transfer the magnetic flux created in stator ore 24 with a very narrow hysteresis loop. In the illustrated embodiment, silicon steel tape having a thickness 0.10 mm-0.20 mm is used to construct stator core 24. In other embodiments, steel tape having a thickness less than 0.10 mm or greater than 0.20 mm can be used. In some embodiments, M-19 silicon steel tape can be used. In some embodiments, grain oriented silicon steel tape may be used. In some embodiments, stator core 24 may be constructed of a soft ferromagnetic material other than steel tape. An advantage in using steel tape in stator core 24 is the improved electrical efficiency of IFES system 20 by reducing losses in stator core 24 that may otherwise occur from using a solid ferromagnetic material for stator core 24. Examples of solid core losses include eddy current and hysteresis losses. Other material compositions are within the scope of the present disclosure. For example, laminated plates of steel may be used to construct stator core 24, and this will be discussed in more detail in FIG. 4B. In some embodiments, granular or composite materials may be used to construct stator core 24.

In the illustrated embodiment, rotor 32 comprises rotor housing 25 and rotor active surfaces 26. Rotor housing 25 defines an interior volume, within which stator 21 is situated. Accordingly, rotor 32 can also be referred to as an outer rotor, to differentiate it from electrical machine rotors of the prior art. Rotor active surfaces 26 are disposed on the interior surface of rotor housing 25, and are configured to pass near the outward-facing surfaces of stator cores 24 during the rotation of rotor 32. In the embodiment illustrated in FIG. 2, rotor active surfaces 26 have three faces in the proximity of any particular stator core 24 and stator coil 28, being on top of, on the outer circumference of, and on the bottom of stator coil 28. In the illustrated embodiment, the three faces correspond to three separate pieces of rotor active surfaces 26. In other embodiments, fewer than three pieces of rotor active surfaces 26 could form the three faces. In yet other embodiments, fewer than three faces could be configured to pass near the outward-facing surfaces of stator cores 24 during the rotation of rotor 32. For example, rotor active surface 26 could be a curved surface that faces inward.

In the illustrated embodiment, the configuration of rotor active surfaces 26 is referred to as a "concentrated-parameter" coil and active surface configuration, because the stator cores 24 produce magnetic flux at both the upper and lower surfaces, and also at the outer surface of stator core 24. Such a configuration maximizes the production of electromagnetic torque, and accordingly, maximizes power density in IFES system 20. Power density may refer to a ratio of electrical power to either the mass, weight, or volume of IFES system 20. In the illustrated embodiment, rotor active surfaces 26 are permanent magnets (this will be illustrated in greater detail in FIGS. 3, 5A, and 5B). In other embodiments, rotor active surfaces 26 may be a cage-type structure, such as a design analogous to a squirrel-cage as used in an induction motor (this will be illustrated in greater detail in FIG. 6). In other embodiments, rotor active surfaces 26 may be a conductive material, for example, copper relining. In yet other embodiments, a rotor design having salient poles may be used, without electrical windings on the salient rotor poles.

Figure 1:
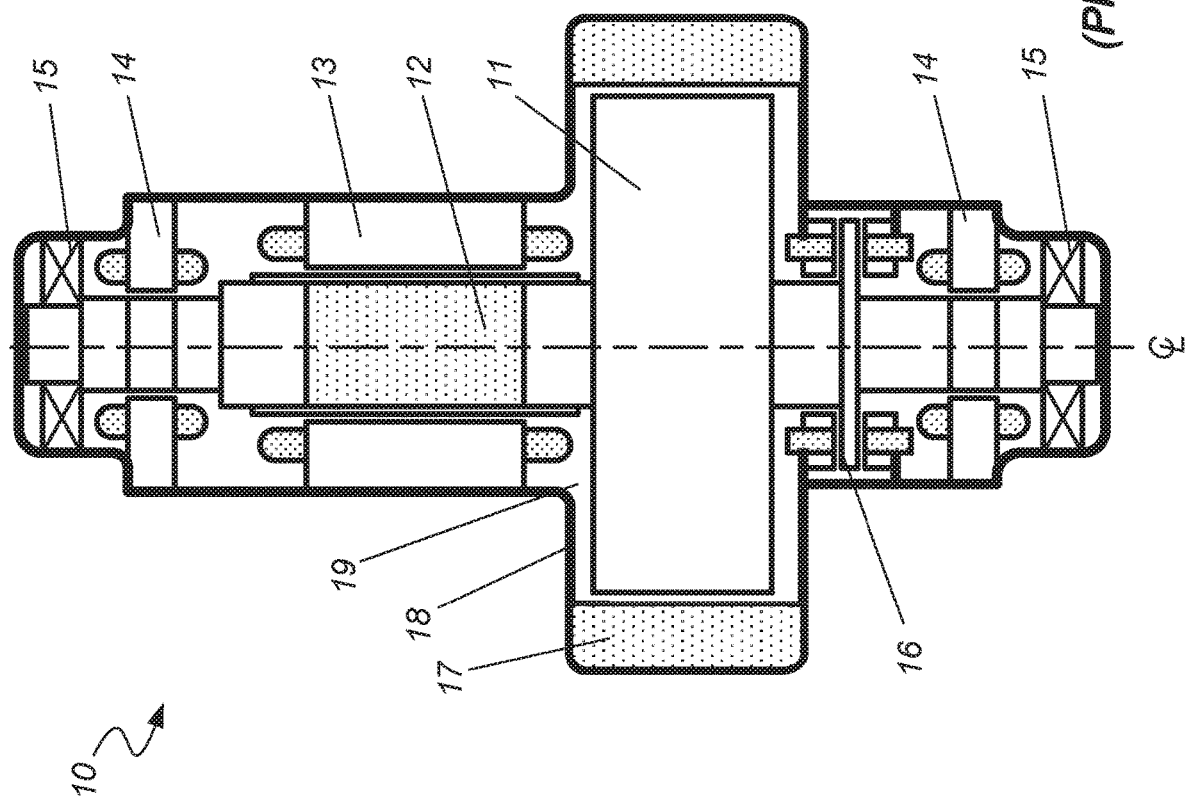
FIG. 1 is a cross-sectional side view of a flywheel energy storage (FES) system of the prior art.

Rotor 32 surrounds stator cores 24 and stator coils 28, thereby occupying a volume much greater than that of the inner stator components (stator support 22, stator cores 24, stator coils 28). Rotor 32 can be made as large and as massive as is desired for a particular embodiment, thereby performing the function of flywheel 11 of FES system 10 of the prior art (shown in FIG. 1). As seen in FIG. 2, there is not a separate flywheel in IFES system 20. Accordingly, in the present disclosure, rotor 32 of the electromechanical motor/generator also performs the function of a flywheel, integrating rotor 32 and a flywheel as a single component, thereby creating integrated flywheel energy storage (IFES) system 20. In the illustrated embodiment, the mass of rotor 32 ($m_{rotor}$) is greater than the mass of stator 21 ($m_{stator}$). IFES system 20 of the present disclosure can be described in terms of the ratio of $m_{rotor}$ to $m_{stator}$. In the illustrated embodiment, $m_{rotor}/m_{stator}$ is greater than 1. In some embodiments, $m_{rotor}/m_{stator}$ is greater than 10. In other embodiments, $m_{rotor}/m_{stator}$ can be a value between 50 and 100. In yet other embodiments, $m_{rotor}/m_{stator}$ can be 100 or greater.

In the illustrated embodiment, rotor housing 25 is constructed of a high-strength fiberglass composite material structure that is able to withstand rotational speed of 20,000 rpm. In other embodiments, other various high-strength structures can be used to construct rotor housing 25, in order to withstand a rotational speed in excess of 20,000 rpm. In some embodiments, maximum rotational speed may be 100,000 rpm or higher. In other embodiments, rotor housing 25 may be constructed of other materials. For example, rotor can be constructed of metal, or a metal alloy. In some embodiments, rotor housing 25 can be constructed of a high-strength metal alloy. In other embodiments, rotor housing 25 may be a combination of metal and non-metal components. In some embodiments, rotor 32 may be designed to operate at a speed less than 20,000 rpm. The designer of IFES system 20 can select the size, weight, materials of construction, and maximum operating speed of rotor 32 as necessary to obtain the desired overall size, weight, and energy storage capacity of IFES system 20 for a particular system application. Equation 1 under the description of FIG. 1 applies to IFES system 20, whereby the stored kinetic energy is directly related to the rotational moment of inertia and to the square of the rotational speed.

In some embodiments, minimizing the overall mass of IFES system 20 relative to its energy storage capacity may be important, with applications aboard aircraft and spacecraft being non-limiting examples. Therefore, a design objective may be to minimize the mass of all components which do not contribute significantly to the rotational moment of inertia (I). Increasing the ratio of $m_{rotor}/m_{stator}$, as noted above, can help to achieve this goal. Important design parameters that may be used include, for example, the ratio of rotational moment of inertia (I) to total system mass (m), and the ratio of maximum energy storage capacity to total system mass (I/m). Therefore, IFES system 20 of the present disclosure can allow a system designer to attain values for these design parameters that greatly exceed values for FES systems of the prior art. From equation 1, the stored rotational kinetic energy ($KE_{Rotational}$) of IFES system 20 is directly related to the rotational moment of inertia (I) for a given angular velocity ($\omega$). In an embodiment, IFES system 20 enables total system mass ($m_{IFES}$) to be reduced to a value that is 70-90% of the total system mass ($m_{FES}$) of FES system 10 of the prior art for an equivalent stored rotational kinetic energy ($KE_{Rotational}$) and angular velocity ($\omega$). In some embodiments, the reduction in total system mass ($m_{IFES}$) of IFES system 20 can be to a value that is less than 70% of the total system mass ($m_{FES}$) of FES system 10 of the prior art. From comparing FIG. 2 to FIG. 1, it can be seen that the reduction in total system mass ($m_{IFES}$) of IFES system 20 is a result of rotor 32, which performs the function of a flywheel, being annular in structure. An annular flywheel structure distributes more of the flywheel mass to an outer radius (measured from the axis of rotation), thereby allowing a greater contribution to the rotational moment of inertia (I), as seen in equation 1. Moreover, the annular-shape of rotor 32 creates an open central region where stator 21 is situated, thereby contributing to the more compact size of IFES system 20.

Upper radial magnetic bearing stator 34 and upper radial magnetic bearing rotor 36 form an upper radial magnetic bearing, and lower radial magnetic bearing stator 38 and lower radial magnetic bearing rotor 40 form a lower radial magnetic bearing, together providing radial support for the rotating components of IFES system 20 at operational speed. Upper rolling bearing 48 and lower rolling bearing 50 provide radial support for the rotating components of IFES system 20 at low speeds, or when IFES system 20 is not operating. Upper axial magnetic bearing stator 42, lower axial magnetic bearing stator 44, and axial magnetic bearing rotor 46 form a magnetic thrust bearing, which supports the weight of the rotating components of IFES system 20 at operational speed. The wiring, electrical components, and control systems for the various magnetic bearings are not shown, because they are known to those who are skilled in the FES system arts. A mechanical thrust bearing (not shown) supports the weight of the rotating components of IFES system 20 at low speed, or when IFES system 20 is not operating.

Vacuum containment case 52 surrounds the rotating components, and particularly rotor 32, of IFES system 20. Vacuum containment case 52 provides an airtight structure around IFES system 20, thereby allowing air to be evacuated from void 54. By operating at a vacuum, windage losses can be reduced, or practically eliminated, from IFES system 20, thereby increasing the overall efficiency of IFES system 20. In some embodiments, a hard vacuum may be created within vacuum containment case 52. The system used for creating and maintaining a vacuum is not shown. In some embodiments, an air scavenging system (not shown) may be used to create a nearly perfect vacuum. In other embodiments, a partial vacuum may be created for reducing, although not entirely eliminating, windage losses. In some embodiments, rotor 32 and other rotating components within IFES system 20 may have designs and surface features that reduce air resistance, and therefore, windage losses. In some embodiments, void 54 may be filled with a low-density gas, for example, helium. In some embodiments where IFES system 20 is designed to operate on a space craft, for example, where a vacuum may naturally exist, it may not be necessary to include a system that creates a vacuum in void 54.

In the embodiment illustrated, vacuum containment case 52 also functions as a burst shield to contain fragments in the event of a catastrophic failure of IFES system 20 at operating speed. In another embodiment, a separate burst shield may be used on IFES system 20 either within or outside of vacuum containment case 52.

Stationary bushing 56 provides support for the various non-rotating components within IFES system 20, including, without limitation, stator support 22, electrical leads 30, upper radial magnetic bearing stator 34, lower radial magnetic bearing stator 40, upper axial magnetic bearing stator 42, lower axial magnetic bearing stator 44, and the raceways (not shown) of upper rolling bearing 48 and lower rolling bearing 50.

Figure 3:
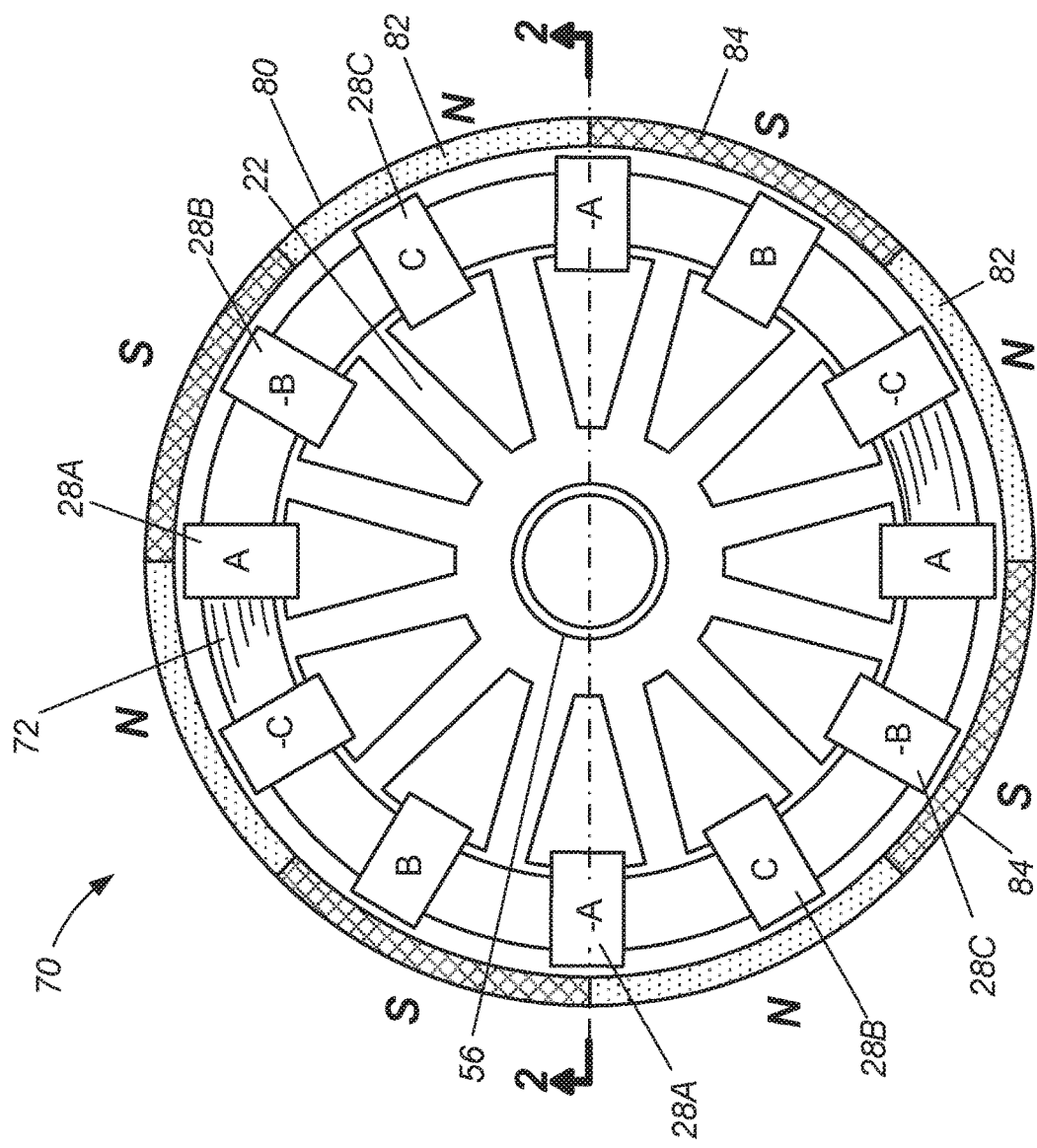
FIG. 3 is a top view of the wound core stator of the IFES system shown in FIG. 2.

FIG. 3 is a top view of IFES system 20 as depicted in FIG. 2. FIG. 3 is taken at line 3-3 in FIG. 2, showing wound stator core 70. Shown is FIG. 3 are stator support 22, stator coils 28A (for power phase A), stator coils 28B (for power phase B), stator coils 28C (for power phase C), stationary bushing 56, stator core 72, rotor permanent magnet (PM) array 80, North PM segments 82, and South PM segments 84.

As discussed previously, stationary bushing 56 supports stator support 22. Wound stator core 70 is in a ring configuration, being supported by stator support 22. Together wound stator core 72 and stator support 22 resembles a wagon wheel design, and can also be referred to as a hub and spoke design or a spider design.

In the embodiment depicted, which is a three-phase electrical system, there are a total of twelve stator coils 28 (four stator coils 28 per electrical phase). There are also a total of eight magnetic poles in rotor PM array 80 (four North PM segments 82 and four South PM segments 84). This combination for the numbers of stator coils 28 and magnetic poles follows the basic rules for motor design that are known to those who are skilled in the electrical machine arts. A first pair of stator coils 28A (for power phase A) are denoted "A" in FIG. 3, and they are diametrically opposite each other along the ring of wound stator core 70. Offset on center by ninety degrees from the first pair of stator coils 28A (for power phase A) is a second pair of stator coils 28A (for power phase A), and are denoted "–A" in FIG. 3. The individual "A" and "–A" phases may be each electrically connected in series or parallel, and the pairs of "A" and "–A" phases may each be electrically connected in series or parallel. Similarly, a total of four stator coils 28B (for power phase B) and four stator coils 28C (for power phase C) are disposed along the ring of wound stator core 70, as illustrated, with each stator coil 28A, 28B, or 28C being offset on center by 30 degrees from the adjacent stator coils. The electrical connections of stator coil 28B (for power phase B) and stator coil 28C (for power phase C) will generally follow the connection methodology used for stator coil 28A (for power phase A) with regard to being electrically connected in series or parallel. The three electrical phases of IFES system 20 can be electrically connected in either a delta or wye configuration. In the illustrated embodiment, a plurality of stator coils 28 (and stator cores 24) comprise IFES system 20, with the number of stator coils 28 being dictated in part by the number of electrical phases being used in IFES system 20. Generally, the number of stator coils 28 will be an even multiple of the number of electrical phases. For example, in embodiment illustrated in FIG. 3 there are three electrical phases and twelve stator coils 28. In another three-phase embodiment there could be six stator coils 28. In yet another three-phase embodiment there could be eighteen, twenty-four, or more stator coils 28.

As noted above, the rules for selecting the number of stator coils 28 and magnetic poles with respect to the number of electrical phases used in a motor design are known to those who are skilled in the electrical motor arts. In other embodiments more than three electrical phases can be used. Generally speaking, any number of electrical phases may be used, only as limited by the number of individual stator coils 28 and the overall size of IFES system 20. In some embodiments, IFES system 20 may be constructed with five, seven, nine, or eleven phases. While a greater number of phases necessitates a corresponding increase in the complexity of power control circuit 60, there are at least two advantages in using a relatively large number of electrical phases: the power handling capacity of each phase of power control circuit 60 is reduced (for a given overall IFES system power capacity), and IFES system 20 reliability is enhanced because of the ability to continue operating after one or more phases fails. In some embodiments, more than eleven electrical phases may be used. Accordingly, IFES system 20 utilizing a large number of phases may have an advantage over a three-phase system where system reliability is critical. An even number of electrical phases is also within the scope of the present disclosure. In another embodiment, IFES system 20 may be designed with only one electrical phase. However, this design would lack the inherent rotating magnetic field that is established with a three (or higher) phase system, and a separate starting coil could be required to initialize the rotation of rotor 32 from a stopped condition. However, one or two electrical phases is also within the scope of the present disclosure.

Shown in FIG. 3 around the outer circumference of wound stator core 70 is a portion of the rotor permanent magnet (PM) array 80. Only the outer faces of rotor PM array 80 are shown in FIG. 3 for ease of description, with the elements of rotor PM array 80 in FIG. 3 corresponding to the outward-most section of rotor active surfaces 26 in FIG. 2 (the entirety of rotor PM array 80 will be illustrated in greater detail in FIGS. 4A and 4B).

In the embodiment illustrated in FIG. 3, rotor PM array 80 is segmented into eight magnetic poles such that there are a total of four North PM segments 82 and four South PM segments 84. There is an alternating North-South magnetic polarity around rotor PM array 80, and each of the eight magnetic poles of rotor PM array 80 are offset on center forty five degrees apart from the adjacent magnetic poles. In other embodiments, more than eight magnetic poles may be used in rotor PM array 80. In yet other embodiments, fewer than eight magnetic poles may be used in rotor PM array 80. In some embodiments, a gap may exist between adjacent North and South faces of rotor PM array 80. In other embodiments, rotor PM array 80 may be arranged in a Halbach array. A Halbach array is known in the magnetic arts, being a particular arrangement of permanent magnets that augments the magnetic field on one side of the array while cancelling the magnetic field to near zero on the other side. This is achieved by having a spatially rotating pattern of magnetization. In the illustrated embodiment, the North and South faces of rotor PM array 80 constitute rotor active surfaces 26 as depicted in FIG. 2. Rotor active surfaces 26 can also be referred to as active rotor poles. As described in FIG. 2, configurations other than permanent magnets may be used to form rotor active surfaces 26. Any other configurations used to form rotor active surfaces 26 can still be referred to as active rotor poles.

A benefit in using wound stator core 70 over a solid ferromagnetic core is the reduction in losses that occur in the core material. Eddy current losses and hysteresis losses are examples of core losses which could degrade the overall efficiency of IFES system 20. In the embodiment depicted in FIG. 3, three electrical phases are used (phases A, B, and C, respectively) with a total of twelve electrical poles. An electrical frequency of 1,333 Hz will result from operating at a speed of 20,000 rpm. At operating speeds other than 20,000 rpm, or with a different rotor PM array 80 configuration, different electrical frequencies may exist. Because eddy current losses, hysteresis losses, and other losses may increase as electrical frequency increases, it may be desirable to limit those losses using a method other than a solid ferromagnetic core. Accordingly, wound stator core 70 is constructed by winding layers of steel ribbon, or tape, as described in FIG. 2.

Figure 4A:
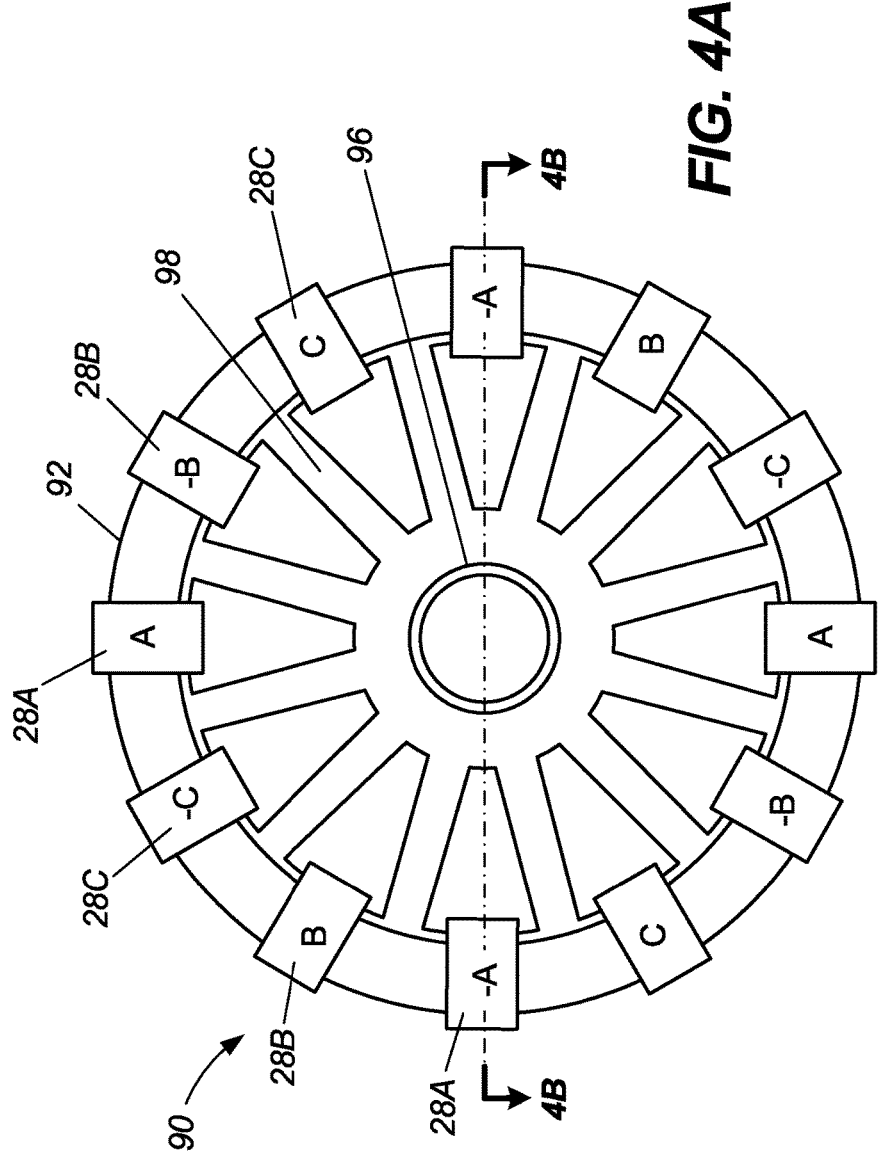
FIG. 4A is a top view of a laminated core stator of an IFES system.

FIG. 4A is top view of an alternative embodiment IFES system 90. Shown in FIG. 4A are laminated core stator 90, stator core 92, stator coils 28A (for power phase A), stator coils 28B (for power phase B), stator coils 28C (for power phase C), stationary bushing 96, and stator support 98. A rotor permanent magnet (PM) array (not shown) may surround laminated core stator 92, similar to that depicted in FIG. 3.

In the illustrated embodiment, stationary bushing 96 supports stator support 98. Laminated stator core 90 is in a ring configuration. Stator support 98 supports laminated stator core 90, with the assembly resembling a wagon wheel design. As described in FIG. 3, there are four stator coils 28A (for power phase A), four stator coils 28B (for power phase B), and four stator coils 28C (for power phase C), and the various electrical phases may be connected in any of several possible configurations.

Figure 4B:
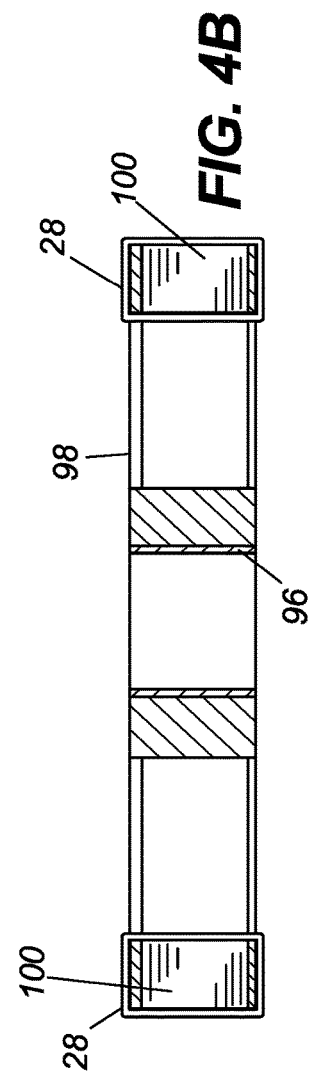
FIG. 4B is a cross-sectional side view of the laminated core stator shown in FIG. 4A.

FIG. 4B is a cross-sectional side view of the laminated core stator shown in FIG. 4A, with the cut being taken at line 4B-4B marked in FIG. 4A. Shown in FIG. 4B are phase coils 28, stationary bushing 96, stator support 98, and laminated stator core 100. Phase coils 28 may be an insulated electrical conductor, as described in FIG. 2. Stationary bushing 96 supports stator support 98. In the embodiment illustrated, stator support 98 has a thin portion at each of the top and bottom. Stator support 98 is constructed from a non-ferromagnetic material. Examples of materials used to construct stator support 98 include, without limitation, aluminum, brass, and fiberglass. In other embodiments, other materials may be used to construct stator support 98. In some embodiments, stator support 98 may be solid material.

In the illustrated embodiment, laminated stator core 100 is constructed from a stack of steel plates with electrical insulation separating the various steel plates, or laminations. The steel plates are a soft ferromagnetic material, for the reasons described with respect to FIG. 2. In the embodiment shown, each plate may be approximately 0.1 mm thick. In other embodiments, the steel plates may have a thickness less than 0.1 mm. In some embodiments, the steel plates may have a thickness greater than 0.1 mm. In some embodiments, the steel plates may all have approximately the same thickness. In other embodiments, the steel plates may have varying thicknesses. In some embodiments, there may be no electrical insulation separating the steel plates. In some embodiments, silicon steel may be used for the steel plates. In some embodiments, a soft ferromagnetic material other than steel may be used. In some embodiments, the steel plates may be held together by a connector (not shown). Examples of connectors may include, without limitation, ferromagnetic or non-ferromagnetic rivets, posts, or clamps. Laminated stator core 100 is an alternative embodiment to using wound stator core 70 as described in FIG. 3, while achieving the similar benefits of reducing stator losses over using a solid piece of ferromagnetic material for a stator core.

FIG. 5A is a perspective view of rotor PM array 80 of IFES system 20 shown in FIG. 2. FIG. 5A is also a perspective view of rotor PM array 80 of IFES system 20 partially shown in FIG. 3, which depicted only one of the active faces of rotor PM array 80. Shown in FIG. 5A are rotor PM array 80, North PM segments 82, and South PM segments 84. FIG. 5A is provided for illustrative purposes, to aid in describing the shape and configuration of rotor PM array 80 in a particular embodiment. In the embodiment illustrated in FIG. 4A, rotor active surfaces 26 of IFES system 20 in FIG. 2 are rotor PM array 80 in FIG. 5A. In the illustrated embodiment, the circumferential arrangement of rotor PM array 80 is the same as was described in FIG. 3, having a total of four North PM segments 82 and four South PM segments 84. In an actual embodiment of IFES system 20, rotor PM array 80 does not stand alone as illustrated. Instead, four North PM segments 82 and four South PM segments 84 of rotor PM array 80 are disposed along the inner surface of rotor housing 25, as shown in FIG. 2, with rotor housing 25 providing structural support for rotor PM array 80. In the illustrated embodiment, rotor PM array 80 consists of eight segments. In other embodiments, rotor PM array 80 can consist of fewer than eight segments. In yet other embodiments, rotor PM array 80 can consist of more than eight segments. Several factors may be considered in determining the number of segments to be used in rotor PM array 80 including, without limitation, the number of electrical phases, the number of stator coils 28, and the overall size and energy storage capacity of IFES system 20. In the illustrated embodiment, North PM segments 82 and South PM segments 84 directly contact each other near their respective adjacent boundaries. In other embodiments, a gap may exist between adjacent North PM segments 82 and South PM segments 84.

FIG. 5B is a perspective cross-sectional view of rotor PM array 80 shown in FIG. 5A. Shown in FIG. 5B are rotor PM array 80, North PM segments 82, and South PM segments 84. The cross-sectional shape of rotor PM array 80 is visible in FIG. 5B, and may be described as a squared "U" or squared "C" shape. The cross-sectional shape of rotor PM array 80 is equivalent to the configuration of rotor active surfaces 26 illustrated in FIG. 2. The cross-sectional shape of rotor PM array 80 is simplified in FIG. 5B for conceptual purposes. In actuality, North PM segments 82 and South PM segments 84 may consist of individual pieces for the side, top, and bottom thereof, to aid in assembling IFES system 20 during manufacturing. Other configurations for the individual magnets that comprise North PM segments 82 and South PM segments 84 are also within the scope of this disclosure.

Figure 6:
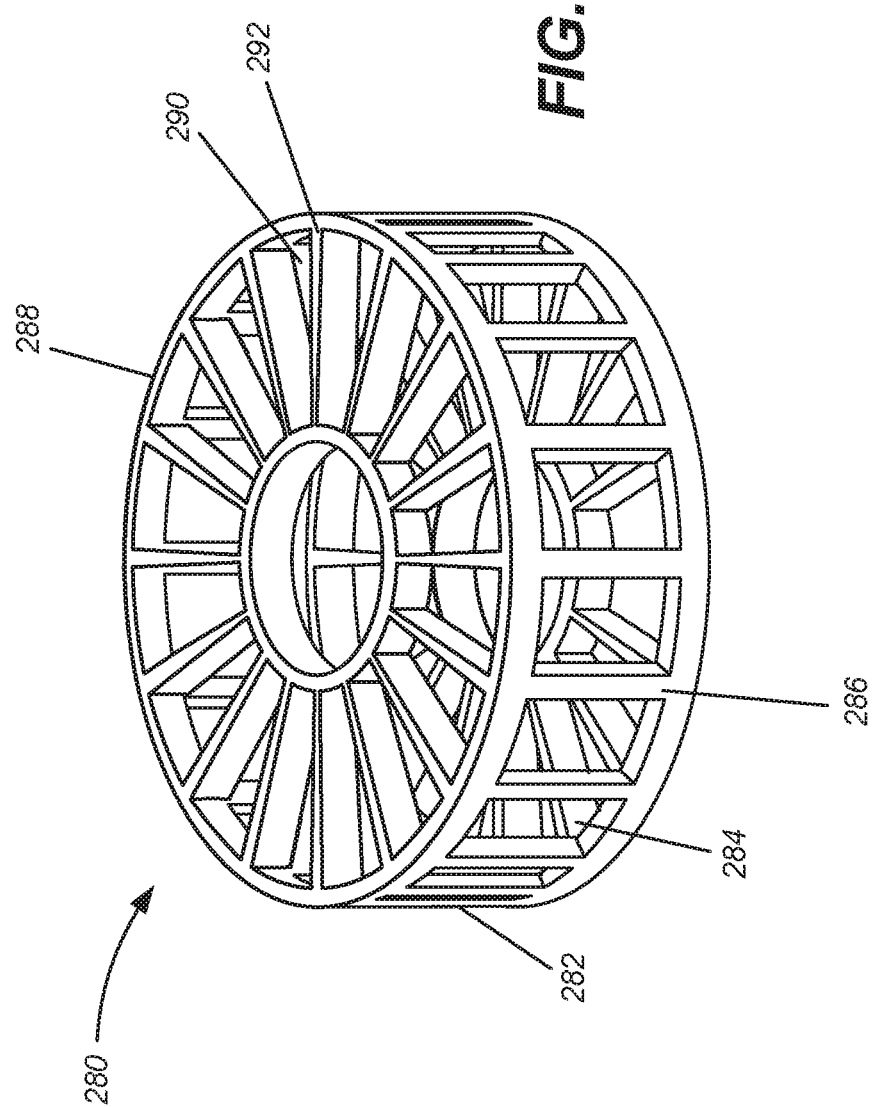
FIG. 6 is a perspective view of a rotor cage assembly of an alternate embodiment IFES system.

FIG. 6 is a perspective view of rotor cage assembly 280 of an alternative embodiment of IFES system 220 utilizing an induction motor rotor. Shown is FIG. 6 is rotor cage assembly 280, rotor cage side 282, rotor side apertures 284, rotor side conductors 286, rotor cage top 288, rotor top aperture 290, and rotor top conductors 292. Rotor cage assembly 280 also has a rotor cage bottom (not shown for the sake of clarity), which is similar to rotor cage top 288. In the illustrated embodiment, rotor cage assembly 280 is shown to be a single stand-alone component to provide a conceptual understanding of the operation thereof. In an actual embodiment, rotor cage side 282, rotor cage top 288, and rotor cage bottom (not shown) may be separate components, to aid in assembling IFES system 20 during manufacturing.

Moreover, rotor cage side 282, rotor cage top 288, and rotor cage bottom (not shown) are disposed along the inner surface of rotor 32, as shown in FIG. 2, with rotor cage side 282, rotor cage top 288, and rotor cage bottom comprising rotor active surfaces 26 as shown in FIG. 2. Rotor cage side 282, rotor cage top 288, and rotor cage bottom are manufactured from non-ferromagnetic electrical conductors. Rotor cage side 282 has a series of rotor side apertures 284 around the circumference, with adjacent rotor side apertures 284 thereby forming rotor side conductors 286. Rotor cage side 282 is described as a "ladder" or "squirrel cage" rotor, with a function known in the electrical arts. When acting as a motor, the magnetic flux created at stator cores 24 by electrical current flowing through stator coils 28, as shown in FIG. 2, induces electrical current flow in rotor side conductors 286, thereby producing a magnetic force, or torque on rotor side conductors 286, thereby imparting a motion in rotor cage side 282, resulting in rotation of rotor 12. A similar but opposite description applies when operating as a generator, with a function similarly known in the electrical arts. Rotor cage side 282 is rotor active surface 26 as shown in FIG. 2.

Similarly, rotor cage top 288 has a series of rotor top apertures 290, with adjacent rotor top apertures 290 thereby forming rotor top conductors 292. Rotor cage bottom (not shown) is similarly constructed. Rotor cage top 288 and rotor cage bottom are also rotor active surface 26 as shown in FIG. 2, thereby contributing to the torque imparted to, or by, rotor 32 of IFES system 220. The proximity of rotor cage side 282, rotor cage top 288, and rotor cage bottom to stator core 24, as shown in FIG. 2, is referred to as a "concentrated-parameter" configuration, as described in FIG. 2, thereby helping maximize the power density of IFES system 220.

The foregoing description pertained to one of several possible embodiments of making an induction machine within an IFES system involving principles that are known within the electrical arts. Instead of using a squirrel cage rotor design, copper relining may be used for rotor active surfaces 26. In other embodiments, electrical conductors other than copper can be used. In yet other embodiments, a rotor design having salient poles may be used, without electrical windings on the salient rotor poles. In some embodiments, a variable reluctance rotor may be utilized employing laminations, solid steel elements, and electrical coils.

IFES system 20 as described in this disclosure can be used as a kinetic battery for storing energy for later use in providing electrical power. IFES system 20 may be used as an uninterruptible power supply (UPS), instead of using a UPS having a chemical battery to store energy. IFES system 20 may be used on an electrical vehicle to store energy, with the benefit of being able to deliver a burst of power when required by an electrical load. An additional benefit of IFES system 20 of the present disclosure is its relatively small volume and mass as compared to an FES system of the prior art having an equivalent storage capacity. Accordingly, vehicles, and particularly aircraft and spacecraft, will be benefited by the high power density that is available from IFES system 20. IFES system 20 may be used independently, or in a bank of two or more IFES systems 20. The high power density of IFES system 20, and its ability to rapidly deliver electrical energy, may be particularly beneficial where a high-power electrical burst is required, such as in a high-power laser, rail gun, kinetic weapon, or electrical catapult. These examples are intended to illustrate the wide range of possible applications of an IFES system without being limiting.

An IFES system may be scaled in size and energy storage capacity, enabling a wide range of applications. For example, a small IFES system may be deployed on an aircraft, spacecraft, or aerial drone. A large IFES system may be deployed on an electrical utility grid, in a building or data center, or on a ship, truck, or train locomotive. These examples are intended to illustrate the wide range of possible applications of an IFES system without being limiting.

A particular advantage of the design of an IFES system is the use of electromechanical components, thereby allowing a wide operating temperature range as compared to chemical batteries. IFES system 20 may undergo a significant, and possibly unlimited, number of operational charge and discharge cycles. In contrast, most chemical battery systems of the prior art are restricted in their number of operational charge/discharge cycles. Chemical battery systems are also restricted to a more limiting temperature range as compared to IFES system 20. Also, electromechanical components make IFES system 20 relatively impervious to the effects of electromagnetic and nuclear radiation, for example, an electromagnetic pulse (EMP) that may result from a nuclear burst which could otherwise destroy semiconductor devices. Because of its high energy density resulting from having a smaller size and weight compared to FES systems of the prior art, IFES system 20 can be deployed in applications where the use of a FES system of the prior art may been impractical, thereby allowing system designers to derive these benefits in a wide range of applications.

The rotating inertia of rotor 32 of IFES system 20, when rotating at an appreciable speed, produces an appreciable gyroscopic effect. The angular momentum of rotor 32 can be calculated by the following equation:

$$L_{anoar} = I\omega \qquad \text{Equation 2:}$$

where I is the rotational moment of inertia and co is the angular velocity.

Accordingly, IFES system 20 can be utilized in a wide range of applications where gyroscopic devices can be used. Examples include the following, without limitation. Tall buildings may include one or more IFES systems 20 to reduce vibrations and swaying, which may occur during storms and earthquakes. Ships and other water-based platforms may include one or more IFES systems 20 to provide stability. Machines and appliances that utilize rotating components and drums, such as mills and clothes washers and dryers, may include one or more IFES systems 20 to provide stability. When IFES system 20 is utilized to provide gyroscopic stability, the building, vehicle, or other platform can be referred to as an exterior structure.

IFES system 20 can be utilized with a power grid and/or with local power generating systems such as solar, hydro-electric, biomass, and wind power, thereby functioning as an energy storage system while also providing gyroscopic stability to structures or vehicles. The angular momentum (L) of IFES system 20 can result in a reduction in the swaying of a tall building during an earthquake, or the rolling of a ship at sea, for example. In an embodiment, a network of IFES systems 20 could be deployed within tall buildings to provide gyroscopic stability to the buildings while also storing electrical energy for use during peak electrical usage. Energy could then be restored to IFES systems 20 from power produced, for example, by a solar network, cogeneration, or from a utility grid at off-peak rates. These examples are not intended to be imitating, and all uses of IFES system 20 are within the scope of the present disclosure.

FIG. 7A is a schematic view of the IFES system of the present disclosure as a gyroscopic reference. Shown in FIG. 7A are IFES gyroscopic reference 330, IFES system 20, electrical lead 30, power control circuit 60, gimbal support 332, gyroscopic reference connection 334, and gyroscopic reference sensor 336. Because IFES system 20 as depicted in FIG. 2 is oriented with the centerline $C_L$ in a vertical direction, IFES gyroscopic reference 330, as shown, can also be called z-axis IFES gyroscopic reference 330. IFES system 20 can be used as an integrated gyroscope for control and/or navigation purposes, either in addition to, or instead of, storing energy. In the illustrated embodiment, IFES system 20 is mounted on gimbal support 332. Gimbal support 332 is a multi-axis support system that supports IFES system 20 while allowing IFES system 20 to maintain a fixed spatial orientation with respect to centerline $C_L$ regardless of the spatial orientation of the surrounding structure. In an embodiment, gimbal support 332 has three degrees of freedom. If z-axis IFES gyroscopic reference 330 is mounted on an aircraft with centerline $C_L$ oriented vertically, then z-axis IFES gyroscopic reference 330 will maintain a vertical orientation of centerline $C_L$ regardless of the bank, roll, or pitch of the aircraft. In other embodiments, gimbal support 332 can have one, two, three, or more than three degrees of freedom. Gimbal support 332 can also be referred to as a binnacle, a term that describes a multi-axis support component such as a compass. Those who are skilled in the arts of gyroscopic instruments are familiar with various mechanisms that are used for providing multi-axis gimbal supports which provide multiple degrees of freedom of movement.

Gyroscopic reference connection 334 connects gyroscopic reference sensor 336 to IFES system 20. Gyroscopic reference sensor 336 can be a sensor that detects alignment, orientation, acceleration, or any other property that can be used to detect alignment or motion. For example, gyroscopic reference sensor 336 can be an artificial horizon for a pilot to fly an aircraft. For further example, gyroscopic reference sensor 336 can be a gyrocompass used for navigation. Additionally, for example, gyroscopic reference sensor 336 can be an accelerometer used as an input to an inertial navigation system aboard an aircraft, spacecraft, ship, or land vehicle. The foregoing are non-limiting examples of how gyroscopic instruments can be used. Therefore, the foregoing are non-limiting examples of how IFES gyroscopic reference 330 can be used as a gyroscopic instrument while also storing kinetic energy within IFES system 20. Accordingly, stored kinetic energy within IFES system 20 can be harvested as electrical energy by the operation of power control circuit 60, as described in FIG. 2.

FIG. 7B is a schematic view showing a configuration of three IFES system gyroscopic references shown in FIG. 7A. Shown in FIG. 7B are z-axis IFES gyroscopic reference 330, y-axis IFES gyroscopic reference 340, x-axis IFES gyroscopic reference 350, and 3-axis gyroscopic arrangement 400. z-axis IFES gyroscopic reference 330, y-axis IFES gyroscopic reference 340, and x-axis IFES gyroscopic reference 350 are shown spatially on an orthogonal x-y-z axis. In the illustrated embodiment, z-axis IFES gyroscopic reference 330, y-axis IFES gyroscopic reference 340, and x-axis IFES gyroscopic reference 350 are each fundamentally similar to IFES gyroscopic reference 330 as described in FIG. 7A, with each having centerline $C_L$ aligned on a corresponding axis. Together, z-axis IFES gyroscopic reference 330, y-axis IFES gyroscopic reference 340, and x-axis IFES gyroscopic reference 350 are part of 3-axis gyroscopic arrangement 400.

In the illustrated embodiment, inertial reference connections 334 and inertial navigation sensors 336 can be accelerometers as part of a 3-dimensional inertial navigation system, and 3-axis gyroscopic arrangement 400 can be used only for navigation purposes. Stored kinetic energy within IFES systems 20 of 3-axis gyroscopic arrangement 400 can be harvested as electrical energy by the operation of power control circuits 60, as described in FIG. 2. Accordingly, 3-axis gyroscopic arrangement 400 can be used for both navigation purposes and as a kinetic battery for storing electrical energy. The physical size of the components of IFES systems 20 within 3-axis gyroscopic arrangement 400 can be scaled over a wide range, thereby allowing for a variety of different uses as described in FIG. 6. Because of the high power density that results from having a smaller size and weight compared to FES systems of the prior art, multiple IFES systems 20 having integrated inertial navigation capability could be deployed aboard a ship, aircraft, spacecraft, or other vehicle, thereby offering design opportunities that would have been considered impractical utilizing FES systems of the prior art.

Discussion of Possible Embodiments

The following are non-exclusive descriptions of possible embodiments of the present invention.

An integrated flywheel energy storage system according to an exemplary embodiment of this disclosure, among other possible things, includes an inner stator defining a centerline, the inner stator including an interior stator support component, a plurality of stator cores connected to the interior stator support component, and a plurality of stator coils, with each stator coil positioned on a respective stator core; and an outer rotor on the same centerline and surrounding the inner stator, with a rotor housing and a number of active rotor poles supported by the rotor housing, with the active rotor poles positioned on the interior of the outer rotor housing and arranged in the proximity of the stator cores.

The integrated flywheel energy storage system of the preceding paragraph can optionally include, additionally and/or alternatively, any one or more of the following features, configurations and/or additional components:

A further embodiment of the foregoing integrated flywheel energy storage system, wherein the outer rotor the outer rotor has a mass, the inner stator has a mass, and the ratio of the outer rotor mass to the inner stator mass is greater than 1.

A further embodiment of the foregoing integrated flywheel energy storage system, wherein the active rotor poles are selected from the group consisting of permanent magnets, rotor cage, copper relining, and variable reluctance poles.

A further embodiment of the foregoing integrated flywheel energy storage system, wherein the permanent magnets are arranged in a Halbach array.

A further embodiment of the foregoing integrated flywheel energy storage system, wherein outer rotor surrounds at least half of the stator cores.

A further embodiment of the foregoing integrated flywheel energy storage system, wherein the integrated flywheel energy storage system is further comprised of concentrated parameter active rotor poles, the concentrated parameter active rotor poles having three active surfaces proximate to the stator cores.

A further embodiment of the foregoing integrated flywheel energy storage system, wherein the integrated flywheel energy storage system is further comprised of a vacuum containment case, wherein the outer rotor is disposed within the vacuum containment case, and the vacuum containment case is configured to contain a vacuum.

A further embodiment of the foregoing integrated flywheel energy storage system, wherein each of the plurality of stator cores is comprised of a ferromagnetic material selected from the group consisting of ferromagnetic tape and stacked ferromagnetic layers.

A further embodiment of the foregoing integrated flywheel energy storage system, wherein the outer rotor housing is comprised of a material selected from the group consisting of fiberglass and an alloy of metal.

A further embodiment of the foregoing integrated flywheel energy storage system, wherein the integrated flywheel energy storage device is further comprised of an exterior structure, and the integrated flywheel energy storage system is configured to have an angular momentum, and the integrated flywheel energy storage device is configured to provide angular momentum support to the outer structure.

A further embodiment of the foregoing integrated flywheel energy storage system, wherein the integrated flywheel energy storage device is further comprised of a gimbal support assembly, a gyroscopic reference sensor, and a gyroscopic reference connector.

An electrical energy storage system according to an exemplary embodiment of this disclosure, among other possible things, includes an inner stator defining a centerline, the inner stator including an interior stator support component, a plurality of stator cores connected to the interior stator support component, and a plurality of stator coils, with each stator coil positioned on a respective stator core; and an outer rotor on the same centerline and surrounding the inner stator, with a rotor housing and a number of active rotor poles supported by the rotor housing, with the active rotor poles positioned on the interior of the outer rotor housing and arranged in the proximity of the stator cores and a power control circuit electrically connected to the plurality of stator coils; wherein the outer rotor housing is configured to produce rotational torque on the outer rotor housing from electrical power supplied to the plurality of stator coils, thereby converting electrical energy into rotational kinetic energy; and wherein the plurality of stator coils are configured to produce electrical power from rotational kinetic energy in the outer rotor housing, thereby converting rotational kinetic energy into electrical energy; and wherein the power control circuit configured to produce a multi-phase variable frequency waveform from an electrical power input, and energize the plurality of stator coils with the multi-phase variable frequency waveform, when operating in an energy storage mode; and to receive a multi-phase variable frequency waveform from the plurality of stator coils, and produce electrical power output from the multi-phase variable frequency waveform, when operating in an energy usage mode.

A further embodiment of the foregoing electrical flywheel energy storage system, wherein the outer rotor the outer rotor has a mass, the inner stator has a mass, and the ratio of the outer rotor mass to the inner stator mass is greater than 1.

A further embodiment of the foregoing electrical flywheel energy storage system, wherein the active rotor poles are selected from the group consisting of permanent magnets, rotor cage, copper relining, and variable reluctance poles.

A further embodiment of the foregoing electrical flywheel energy storage system, wherein the electrical flywheel energy storage system is further comprised of concentrated parameter active rotor poles, the concentrated parameter active rotor poles having three active surfaces proximate to the stator cores.

A further embodiment of the foregoing electrical flywheel energy storage system, wherein the outer rotor surrounds at least half of the stator cores.

A further embodiment of the foregoing electrical flywheel energy storage system, wherein each of the plurality of stator cores is comprised of a ferromagnetic material selected from the group consisting of ferromagnetic tape and stacked ferromagnetic layers.

A further embodiment of the foregoing electrical flywheel energy storage system, wherein the outer rotor housing is comprised of a material selected from the group consisting of fiberglass and an alloy of metal.

A further embodiment of the foregoing electrical energy storage system, wherein the electrical energy storage device is further comprised of an exterior structure, and the electrical energy storage system is configured to have an angular momentum, and the electrical energy storage device is configured to provide angular momentum support to the exterior structure.

A further embodiment of the foregoing electrical energy storage system, wherein the electrical energy storage device is further comprised of a gimbal support assembly, a gyroscopic reference sensor, and a gyroscopic reference connector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An electrical energy storage system comprising:
an inner stator defining a centerline, the inner stator including:
a non-ferromagnetic interior stator support component comprising:
a stationary bushing defining a center region; and
a plurality of spokes projecting outward from the center region toward a plurality of stator cores connected to the non-ferromagnetic interior support component; and
a plurality of stator coils, each of the plurality of stator coils being disposed on each of the plurality of stator cores; and
an outer rotor axially disposed along the centerline and around the inner stator, the outer rotor comprising:
a rotor housing; and
a plurality of active rotor poles supported by the rotor housing, wherein:
each of the plurality of active rotor poles is disposed on the interior of the outer rotor housing;
the plurality of active rotor poles are arranged proximate to the plurality of stator cores;
each of the plurality of stator cores defines an active top, outer, and bottom stator core surface; and
each of the plurality of active rotor poles defines an active top, outer, and bottom rotor surface proximate the active top, outer, and bottom stator core surface, respectively, such that the outer rotor at least partially surrounds the plurality of stator cores; and
a power control circuit, the power control circuit electrically connected to the plurality of stator coils;
wherein:
the outer rotor housing is configured to produce rotational torque on the outer rotor housing from electrical power supplied to the plurality of stator coils, thereby increasing a rotational speed of the outer rotor housing and converting electrical energy into rotational kinetic energy;
the plurality of stator coils are configured to produce electrical power from rotational kinetic energy in the outer rotor housing, thereby decreasing the rotational speed of the outer rotor housing and converting rotational kinetic energy into electrical energy; and
the power control circuit configured to:
produce a multi-phase variable frequency waveform from an electrical power input, wherein the frequency varies directly with the rotational speed of the outer rotor housing; and
energize the plurality of stator coils with the multi-phase variable frequency waveform, when the electrical energy storage system is operating in an energy storage mode; and
receive a multi-phase variable frequency waveform from the plurality of stator coils; and produce electrical power output from the multiphase variable frequency waveform, when the electrical energy storage system is operating in an energy delivery mode.

2. The integrated flywheel energy storage device of claim 1, wherein:
the outer rotor has a mass;
the inner stator has a mass; and
the ratio of the outer rotor mass to the inner stator mass is greater than 1.

3. The electrical energy storage system of claim 1, wherein the active rotor poles are selected from the group consisting of permanent magnets, rotor cage, copper relining, and variable reluctance poles.

4. The electrical energy storage system of claim 1, wherein:
the outer rotor surrounds at least half of combined surfaces of the active top, outer, and bottom stator cores;
the active rotor poles are concentrated parameter active rotor poles; and
each of the concentrated parameter active rotor poles has three active surfaces comprising the active top, outer, and bottom rotor surfaces.

5. The integrated flywheel energy storage device of claim 1, wherein the outer rotor surrounds at least half of combined surfaces of the active top, outer, and bottom stator cores.

6. The integrated flywheel energy storage device of claim 1, wherein each of the plurality of stator cores is comprised of a ferromagnetic material selected from the group consisting of ferromagnetic tape and stacked ferromagnetic layers.

7. The integrated flywheel energy storage device of claim 1, wherein the outer rotor housing is comprised of a material selected from the group consisting of fiberglass and an alloy of metal.

8. The electrical energy storage system of claim 1, further comprising an exterior structure, wherein:
the integrated flywheel energy storage device is configured to have an angular momentum;
the integrated flywheel energy storage device is configured to provide angular momentum support to the exterior structure; and
the exterior structure is a building, a vehicle, a ship, or another machine.

9. The electrical energy storage system of claim 8, further comprising:
a gimbal support assembly;
a gyroscopic reference sensor; and
a gyroscopic reference connector.

* * * * *